United States Patent
Brown et al.

(10) Patent No.: US 9,189,541 B2
(45) Date of Patent: Nov. 17, 2015

(54) EVIDENCE PROFILING

(75) Inventors: Eric W. Brown, New Fairfield, CT (US); Jennifer Chu-Carroll, Dobbs Ferry, NY (US); James J. Fan, Hawthorne, NY (US); David A. Ferrucci, Yorktown Heights, NY (US); David C. Gondek, Astoria, NY (US); Anthony T. Levas, Yorktown Heights, NY (US); James W. Murdock, IV, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 13/243,891

(22) Filed: Sep. 23, 2011

(65) Prior Publication Data

US 2012/0131016 A1 May 24, 2012

Related U.S. Application Data

(60) Provisional application No. 61/386,072, filed on Sep. 24, 2010.

(51) Int. Cl.
*G06F 17/30* (2006.01)

(52) U.S. Cl.
CPC .... *G06F 17/30707* (2013.01); *G06F 17/30651* (2013.01); *G06F 17/30696* (2013.01); *G06F 17/30713* (2013.01)

(58) Field of Classification Search
CPC ............... G06F 17/30696; G06F 17/30716; G06F 17/30651; G06F 17/30713
USPC ......... 707/722, 724, 728, 732, 733, 734, 748, 707/758, 767, 771, 778, E17.048, 999.003
See application file for complete search history.

(56) References Cited

U.S. PATENT DOCUMENTS

| | | | |
|---|---|---|---|
| 5,519,608 A | 5/1996 | Kupiec | |
| 5,634,051 A | 5/1997 | Thomson | |
| 5,794,050 A | 8/1998 | Dahlgren et al. | |
| 6,707,454 B1 * | 3/2004 | Barg et al. | 345/440 |
| 7,092,928 B1 | 8/2006 | Elad et al. | |
| 7,181,438 B1 | 2/2007 | Szabo | |
| 7,558,778 B2 | 7/2009 | Carus et al. | |
| 7,590,606 B1 | 9/2009 | Keller et al. | |
| 7,660,822 B1 * | 2/2010 | Pfleger | 707/999.107 |
| 7,953,720 B1 * | 5/2011 | Rohde et al. | 707/706 |
| 8,156,131 B2 * | 4/2012 | Marsden et al. | 707/752 |
| 2004/0093328 A1 * | 5/2004 | Damle | 707/3 |
| 2004/0181507 A1 * | 9/2004 | Megiddo et al. | 707/1 |
| 2004/0254917 A1 | 12/2004 | Brill et al. | |

(Continued)

OTHER PUBLICATIONS

International Search Report mailed Dec. 7, 2011 in corresponding International Application No. PCT/US11/52979.

(Continued)

*Primary Examiner* — Miranda Huang
(74) *Attorney, Agent, or Firm* — Scully, Scott, Murphy & Presser, P.C.

(57) ABSTRACT

Evidence profiling, in one aspect, may receive a candidate answer and supporting pieces of evidence. An evidence profile may be generated, the evidence profile communicating a degree to which the evidence supports the candidate answer as being correct. The evidence profile may provide dimensions of evidence, and each dimension may support or refute the candidate answer as being correct.

10 Claims, 12 Drawing Sheets

(56) References Cited

U.S. PATENT DOCUMENTS

| | | | |
|---|---|---|---|
| 2005/0086045 | A1 | 4/2005 | Murata |
| 2005/0114327 | A1 | 5/2005 | Kumamoto et al. |
| 2005/0160107 | A1* | 7/2005 | Liang .......................... 707/100 |
| 2005/0289168 | A1 | 12/2005 | Green et al. |
| 2006/0116994 | A1* | 6/2006 | Jonker et al. .................... 707/3 |
| 2007/0005520 | A1 | 1/2007 | Eick et al. |
| 2007/0136246 | A1 | 6/2007 | Stenchikova et al. |
| 2008/0016058 | A1* | 1/2008 | Murphy et al. ................. 707/5 |
| 2008/0163099 | A1* | 7/2008 | Gu et al. ....................... 715/780 |
| 2009/0192966 | A1 | 7/2009 | Horvitz et al. |
| 2009/0259642 | A1 | 10/2009 | Cao et al. |
| 2009/0287678 | A1 | 11/2009 | Brown et al. |
| 2009/0292687 | A1 | 11/2009 | Fan et al. |
| 2010/0100546 | A1 | 4/2010 | Kohler |
| 2011/0066587 | A1 | 3/2011 | Ferrucci et al. |
| 2011/0184956 | A1* | 7/2011 | Dantsker et al. ............. 707/741 |

OTHER PUBLICATIONS

Chu-Carroll et al., "In Question-Answering, Two Heads are Better than One", HLT-NAACL'03, May-Jun. 2003, pp. 24-31, Edmonton, Canada.

Ferrucci et al., "Towards the Open Advancement of Question Answering Systems." IBM Technical Report RC24789, Computer Science, Apr. 22, 2009.

Moldovan et al., "COGEX: A Logic Prover for Question Answering." Proceedings of HLT-NAACL 2003, May-Jun. 2003, pp. 87-93, Edmonton.

Simmons, "Natural Language Question-Answering Systems: 1969." Communications of the ACM, Jan. 1970, pp. 15-30, 13(1).

Voorhees et al., "Overview of the TREC 2005 Question Answering Track." In Proceedings of the Fourteenth Text Retrieval Conference, 2005, Gaithersburg, Maryland.

Weinstein et al., Agents Swarming in Semantic Spaces to Corroborate Hypotheses, AAMAS'04, Jul. 19-23, 2004, New York, New York, USA, Copyright 2004 ACM 1-58113-864-4/04/0007.

Prager et al., "A Multi-Strategy, Multi-Question Approach to Question Answering." In New Directions in Question-Answering, Maybury, M. (Ed.), AAAI Press, 2004.

Strzalkowski et al. "Advances in Open-Domain Question-Answering," Springer, 2006 (background information only—copy of the front cover, copyright page and table of contents only).

Balahur, "Going Beyond Traditional QA Systems: Challenges and Keys in Opinions Question Answering," Coling 2010: Poster Volume, pp. 27-35, Beijing, Aug. 2010.

Blitzer, Domain Adaptation of Natural Language Processing Systems, Presented to the Faculties of the University of Pennsylvania in Partial Fulfillment of the Requirements for the Degree of Doctor of Philosophy, 2007.

University of Illinois at Urbana-Champaign, Department of Computer Science, Research, 2010 http://cs.illinois.edu/research?report=UIUCDCS-R-2008-2974.

National Center for Biotechnology Information (NCBI), Entrez the Life Sciences Search Engine, Oct. 28, 2009.

Chang et al., "Creating an Online Dictionary of Abbreviations from Medline," J Am Med Inform Assoc. 2002; 9:612-620. DOI 10.1197/jamia.M1139.

Adar, "SaRAD: a Simple and Robust Abbreviation Dictionary," Bioinformatics, Mar. 2004, pp. 527-533, vol. 20 Issue 4.

\* cited by examiner

Question

HOLY PLACE NAMES: You'll find Bethel College & Seminary in this "holy" Minnesota city

Ranked List

▼ Ranked List of Weighted Values

| Feature Groups/Features ▲ | Model Weight | Saint Paul |
|---|---|---|
| Experiment Label | week52 | week52 |
| Final Score | | 0.008 |
| Weighted Features Sum | | -6.043 |
| ANSWER_IN_CLUE | | 19.501 |
| ANSWER_LOOKUPS | | -4.640 |
| CONSTRAINTS | | 1.434 |
| DEFINITION | | -0.911 |
| DOCUMENT_SUPPORT | | -0.155 |
| GENDER | | 0 |
| GENERIC_SPECIFIC | | 0.351 |
| GEOSPATIAL | | 0.263 |
| PASSAGE_SUPPORT | | 0.723 |
| POPULARITY | | -3.983 |
| PRELIMINARY_FILTER | | -0.921 |
| PRIOR_PROBABILITY | | -21.028 |
| QUESTION_CLASS | | -0.118 |
| RELATIONS | | 0 |
| SOURCE_RELIABILITY | | 3.849 |
| TEMPORAL | | 0.668 |
| TYPE_MATCH | | 0.797 |
| WORD_ASSOCIATION | | -1.873 |

FIG. 3

Question

HOLY PLACE NAMES: You'll find Bethel College & Seminary in this "holy" Minnesota city Diff [Saint Paul, South Bend]

▼ Compare "Saint Paul" and "South Bend"

| Feature Groups/Features ▲ | Diff Value Bar | Diff Value | Saint Paul | South Bend | Headroom |
|---|---|---|---|---|---|
| Experiment Label | | | week52 | week52 | |
| Final Score | | | 0.008 | 0.073 | |
| Weighted Features Sum | | -2.832 | -1.597 | 1.235 | |
| DOCUMENT_SUPPORT | | -0.805 | -0.253 | 0.552 | |
| SpatialDistance | | -0.004 | 0.001 | 0.005 | n/a |
| SpatialDistance-Std | | 0.005 | 0.019 | 0.014 | n/a |
| SpatialRelationSat-Std | | 0.273 | 0.243 | -0.030 | n/a |
| PASSAGE_SUPPORT | | -1.294 | 0.808 | 2.102 | |
| POPULARITY | | -1.123 | -0.224 | 0.899 | |
| SOURCE_RELIABILITY | | -0.620 | -0.101 | 0.519 | |
| TYPE_MATCH | | -0.221 | 0.168 | 0.389 | |
| WORD_ASSOCIATION | | 0.957 | -2.258 | -3.214 | |

FIG. 5

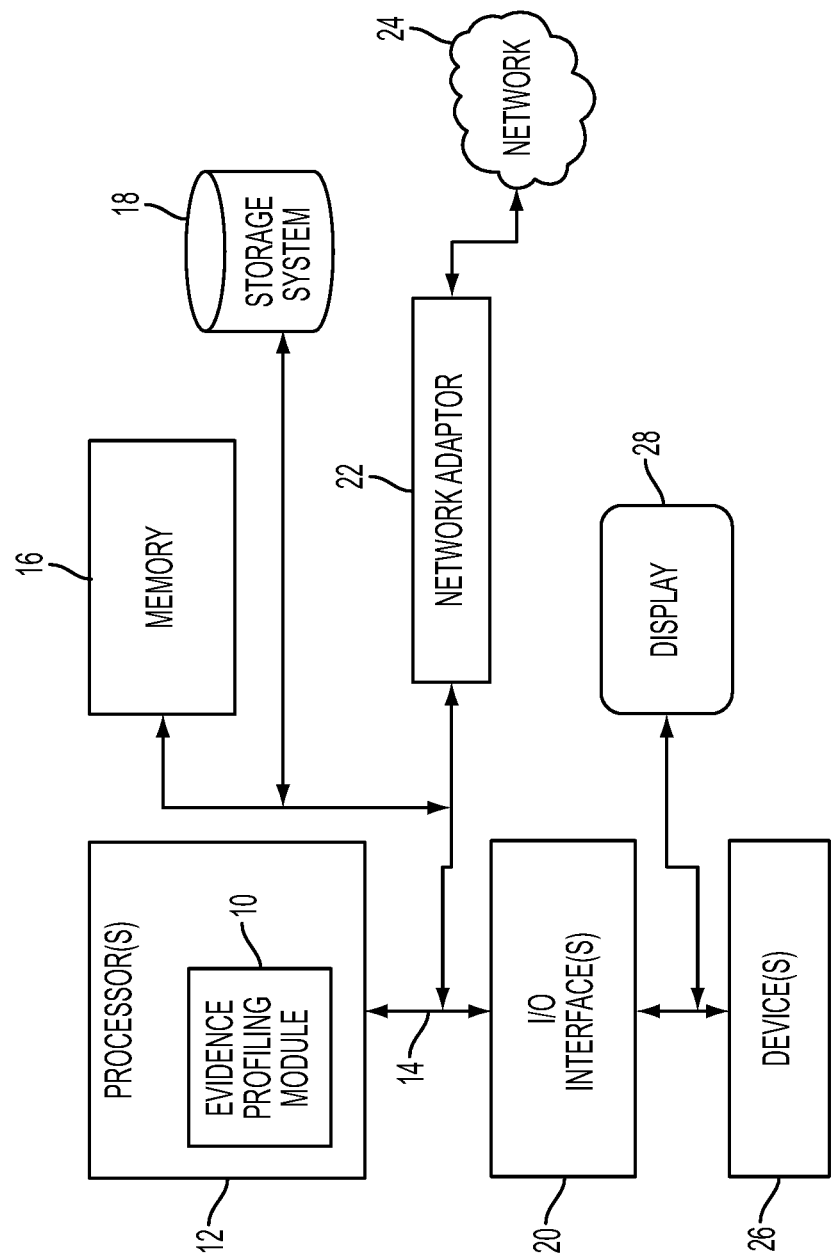

EVIDENCE PROFILING

CROSS-REFERENCE TO RELATED APPLICATIONS

This application claims the benefit of U.S. Provisional Application No. 61/386,072, filed on Sep. 24, 2010, which is incorporated by reference herein in its entirety.

FIELD OF THE INVENTION

The present application relates generally to computers, and computer applications, and more particularly to artificial intelligence and natural language processing.

BACKGROUND

In systems that produce or evaluate candidate answers, also referred to herein as hypotheses (statements that are posed as true), it is difficult for end users to understand the origin or evaluation of a particular hypothesis. It is also difficult for users to compare multiple hypotheses and understand why the system prefers one hypothesis over another. Current systems fail to organize evidence for a hypothesis into a semantically meaningful, intuitive, and comprehensive view for the user so that the user can easily understand the system's evaluation of a hypothesis.

BRIEF SUMMARY

A method for evidence profiling, in one aspect, may include receiving a candidate answer and supporting pieces of evidence. The method may also include generating an evidence profile communicating a degree to which the evidence supports the candidate answer as being correct, wherein the evidence profile provides dimensions of evidence and each dimension may support or refute the candidate answer as being correct.

A system for evidence profiling, in one aspect, may include a module operable to execute on the processor and receive a candidate answer and supporting pieces of evidence. The module may be further operable to generate an evidence profile communicating a degree to which the evidence supports the candidate answer as being correct, wherein the evidence profile provides dimensions of evidence and each dimension may support or refute the candidate answer as being correct.

The system may also include a visualization logic module operable to enable visualization of the evidence profile such that each dimension of evidence can be selected and a weight associated with each dimension altered.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 3 shows examples of evidence dimensions for a single hypothesis in one embodiment of the present disclosure.

FIG. 5 shows visualization for hierarchically drilling-down into one of the evidence dimensions in one embodiment of the present disclosure.

FIG. 11 illustrates a schematic of an example computer or processing system that may implement the evidence profiling in one embodiment of the present disclosure.

DETAILED DESCRIPTION

Figure 1:
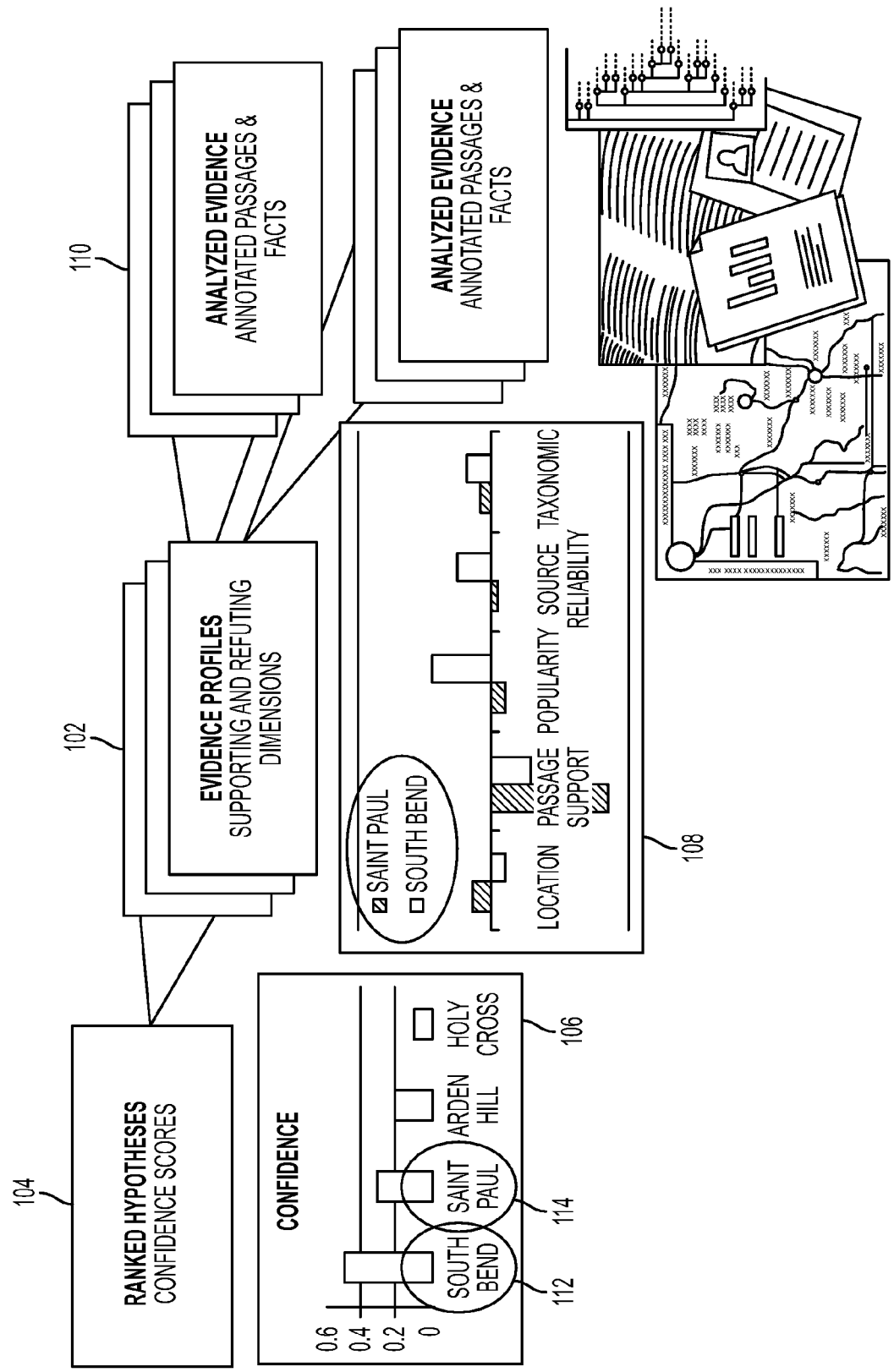
FIG. 1 is a diagram illustrating a process of drilling down from ranked hypotheses through evidence profiles to original sources in one embodiment of the present disclosure.

A question answering system takes a natural language question as input and produces candidate answers as hypotheses. These candidate answers are scored and ranked in some relative order, but the justification for this scoring and ranking up to now has been hidden from the end user. As a non-limiting example, the methodologies described herein may be utilized in question answering (QA) systems such as those described in U.S. patent application Ser. No. 12/152,411 and U.S. patent application Ser. No. 12/126,642, which are incorporated herein by reference in their entirety. The present invention may be used in conjunction with any system that produces and/or evaluates hypotheses.

A QA system may take as input a question expressed in natural human language and, in return, produce a precise answer or ranked list of answers to the question along with a confidence score for each answer. Here each candidate answer is a hypothesis, and the QA system may evaluate each candidate answer based on the originally input question. The candidate answer can be obtained from a corpus of documents and data, both structure and unstructured. A variety of analytics are used to analyze the question, obtain candidate answers, analyze supporting evidence for each candidate answer, generate feature scores for each candidate answer, and combine individual feature scores into a final confidence score for each candidate answer.

Given just the final ranked list of candidate answers and confidence scores and/or ranking, the user may have no insight into why the candidate answers received their raw confidence scores or relative ranks. The user may benefit from more detailed information on why the system prefers one hypothesis over another. This information is useful to a range of users. For the end user of the QA system, this detailed information may provide more background knowledge about the answer generated by the system and increase the user's confidence in the quality of the result. For the system developer, a detailed view that explains how the confidence scores for each hypothesis are generated may be an invaluable tool for debugging and tuning the system.

The methodology of the present disclosure in one embodiment may provide an explanation of how an automatic question answering system produced a final set of ranked candidate answers in response to a natural language question. In the present disclosure, a hypothesis may be a candidate answer to a natural language question automatically obtained by a question answer system. The system may store evidence to support the hypothesis obtained from a corpus of unstructured, semi-structured, or structured information. The methodology of the present disclosure in one embodiment automatically assigns weights or scores to the evidence based on analytics that analyze the original question, hypotheses, and evidence. A large number of fine-grained analytics may produce hundreds of scores for a hypothesis, which can then be hierarchically organized into higher-level evidence profile dimensions, providing users with a more practical and easy to comprehend view of why one hypothesis scores higher than another. The methodology of the present disclosure in one embodiment may automatically generate the hypotheses, the evidence, and the evidence profile.

Existing methodologies do not consider arbitrary, fine-grained evidence that can be organized into hierarchical evidence dimensions, and does not in any way provide measures, comparisons, or visualizations that indicate to the end user which evidence dimensions cause one hypothesis to be ranked higher than another hypothesis and how individual pieces of evidence contribute to each hypothesis. In contrast, the methodology of the present disclosure in one embodiment may provide a how each evidence dimension contributes to the score of a hypothesis, and how different hypotheses compare to each other along arbitrary evidence dimensions.

The present disclosure in one embodiment provides a system and method for presenting this detailed information, referred to herein as an "evidence profile." The evidence profile explains why and how a hypothesis is supported by the content. The evidence profile allows users to compare multiple hypotheses and understand why one hypothesis is preferred over another. The evidence profile also shows how the underlying content used to produce and evaluate the hypothesis supports or refutes the hypothesis along a number of different evidence dimensions.

A methodology of the present disclosure in one embodiment may organize the underlying features and scores used to evaluate hypotheses into evidence dimensions. An evidence dimension is a semantically meaningful collection of underlying feature scores, such as geographic, taxonomic, temporal, popularity, and others. Evidence dimensions are hierarchical and may be expanded into more detailed dimensions or collapsed into higher level dimensions. In one embodiment of the present disclosure, all of the evidence dimensions together form an evidence profile for the hypothesis.

FIG. 1 shows a chart explaining how candidate answers or hypotheses 104 may have evidence profiles 102 providing meaningful information about individual pieces of evidence 110. Evidence profiles 102 in one embodiment of the present disclosure act as a central component of an overall result exploration process. For instance, an exploration may start with the ranked hypotheses 104, or candidate answers. To understand why a particular hypothesis received its score, the user may then navigate to the evidence profile 102 for that hypothesis. The evidence profile 102 in one embodiment reveals the various dimensions of evidence supporting one or more hypotheses with given confidence levels 106 and leads the user to a full provenance chain of associated pieces of evidence 110 and their scores. Examples of evidence dimensions (e.g., shown at 108) may include items such as: Taxonomic, Geospatial (location), Temporal, Source Reliability, Gender, Name Consistency, Relational, Passage Support, Theory Consistency, and/or others. The dimensions may depend on the types of algorithms that were used to gather and score evidence. Once exploring an evidence dimension the user can navigate to the source evidence 110, such as the actual passages, documents, or database facts that were used to produce the score on that dimension.

Evidence profiles 102 may be compared for competing hypotheses. As an example, FIG. 1 shows four possible answers to a question represented by hypotheses ranked by a system's assigned confidence scores 106. Two are selected, Saint Paul 112 and South Bend 114, for further exploration through evidence profiles 102. Next, the system may display a comparative evidence profile showing a select set of evidence dimensions for each answer (e.g., 108). Drilling down further in any one of the dimensions in the evidence profile produces the original source content used to produce the corresponding confidences.

Figure 2:
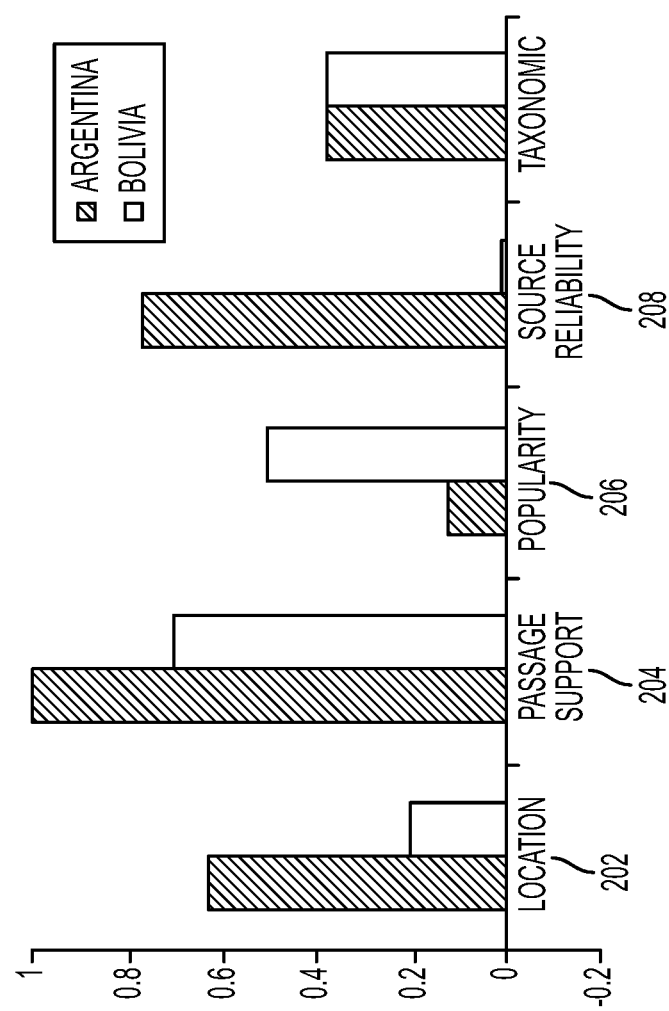
FIG. 2 shows an example answer produced by a methodology of the present disclosure in one embodiment as a candidate for completing a hypothesis.

FIG. 2 shows a comparison of evidence profiles for candidate answers (i.e. hypotheses) Argentina and Bolivia. As a non-limiting example, both Argentina and Bolivia were produced by a question answering system based on the following input:

Chile shares its longest land border with X.

If the ideal source is accessible or available, this is a question that can be answered with complete certainty, but for the sake of demonstration it is assumed that the available content did not include the ideal source. FIG. 2 shows that Argentina is favored as the correct hypothesis over Bolivia in the dimensions of location 202, passage support 204 and source reliability 208. Whereas Bolivia is favored as the correct hypothesis over Argentina in the dimension of popularity 206. A question answering system could adapt to stronger evidence dimensions through training. With stronger and more precise geospatial content and reasoning, for example, the system would learn to weight geospatial evidence higher and the weighted bar for that dimension might have alone outweigh other evidence.

A methodology of the present disclosure in one embodiment may be implemented by recording the feature scores assigned to a given hypothesis by the various analytics that score hypotheses, grouping the features into semantically meaningful evidence dimensions, and visualizing the contributions along each evidence dimension to show the overall feature profile for the hypothesis.

The evidence profile may be visualized in a variety of different ways. A number of visualizations of the evidence profile may provide a range of user types with a wide variety of techniques for understanding the justification for a particular hypothesis, comparing hypotheses, debugging system behavior, and others.

FIG. 3 shows examples of evidence dimensions for a single hypothesis. In FIG. 3, the question posed is "You'll find Bethel College & Seminary in this "holy" Minnesota city". In the visualization shown in FIG. 3, the evidence profile for a single hypothesis, Saint Paul, is given, showing the relative contributions, both supporting and opposing, along each evidence dimension for the hypothesis.

Figure 4:
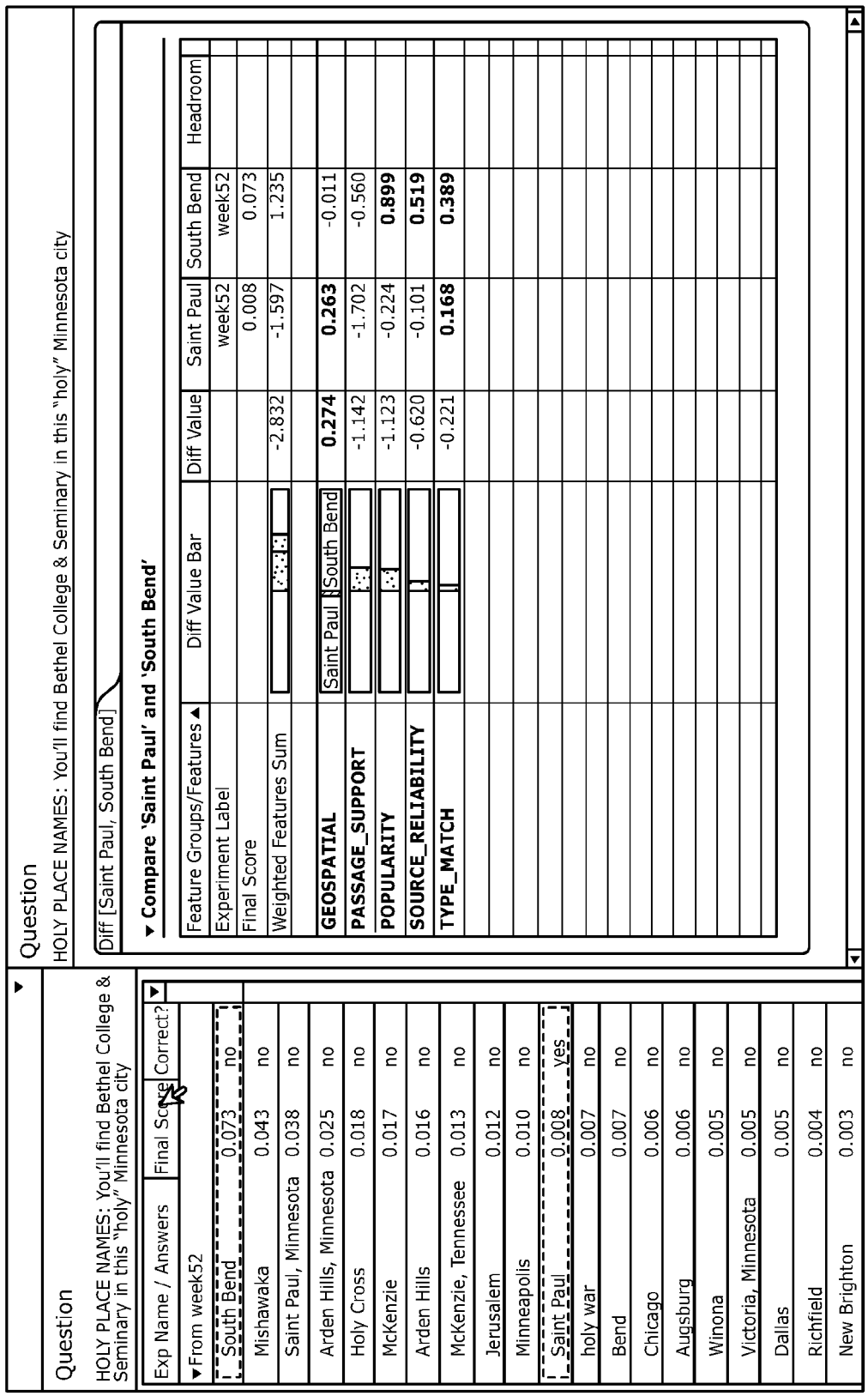
FIG. 4 shows another example of visualization in one embodiment of the present disclosure.

FIG. 4 shows another example of visualization showing a comparison of evidence profiles for two hypotheses. Using a comparative evidence weight plot, the evidence profiles for two competing hypotheses are compared and differences along each evidence dimension are highlighted. For example, an evidence weight plot is one example of visualization for showing the relative contributions of each evidence dimension for a given hypothesis. The evidence weight plot can be used to visualize the comparison of two hypotheses by showing only those dimensions that provide different levels of support for the two answers, and may optionally show the relative differences.

FIG. 5 shows yet another example of visualization showing a comparison of evidence profiles for two hypotheses. FIG. 5 shows visualization for hierarchically drilling-down into one of the evidence dimensions. In FIG. 5, one of the dimensions may be drilled down into, and the details of more fine-grained evidence dimensions may be viewed. For example, "geospatial" dimension may be include "SpatialDistance", "SpatialDistance-Std" and SpatialRelationSat-Std" fine-grained evidence dimensions. In another embodiment, not shown, the evidence dimensions can be drilled down even further to provide individual pieces of evidence and the associated contribution to each evidence dimension.

Figure 6:
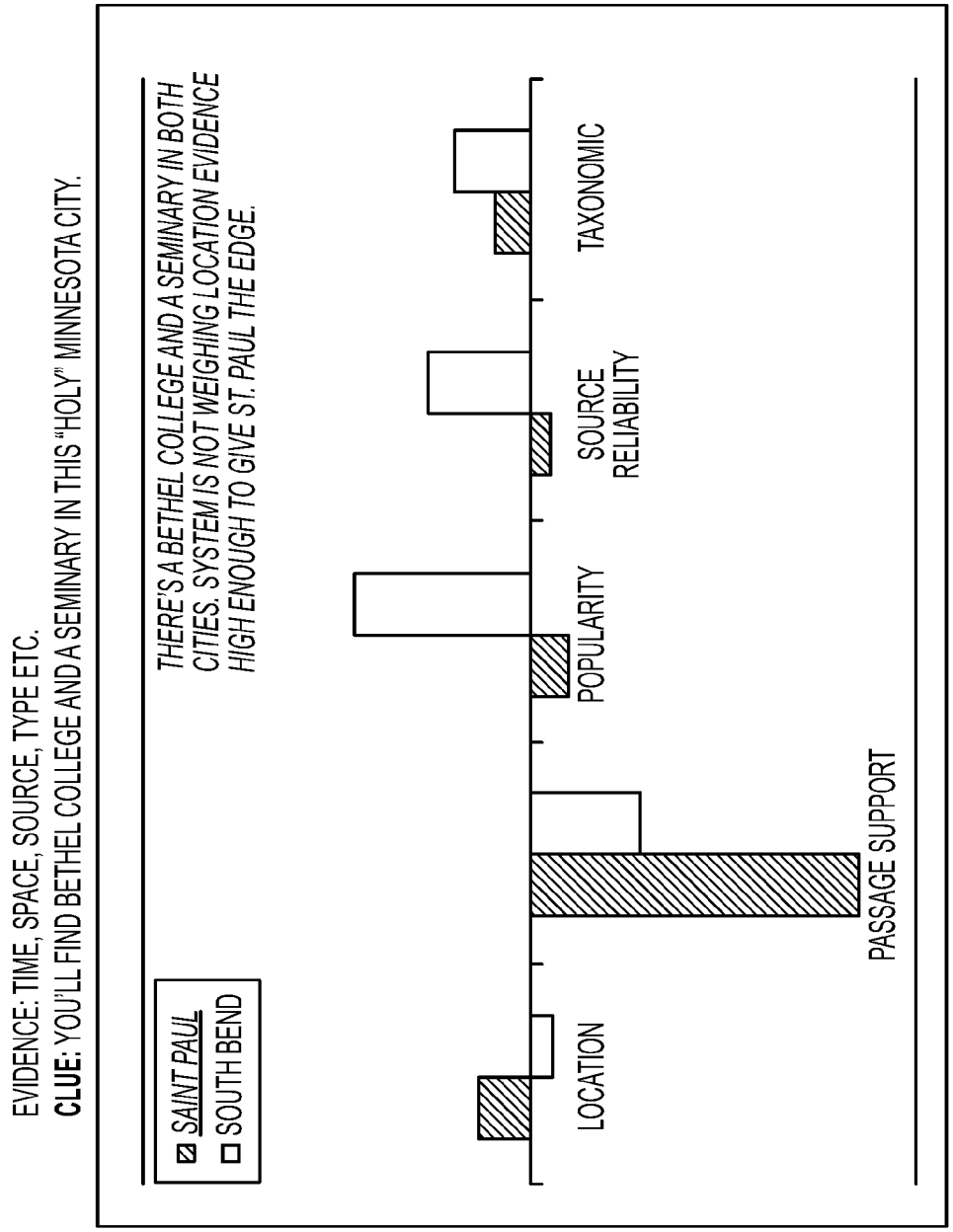
FIG. 6 shows another example of evidence profile visualization in one embodiment of the present disclosure.

FIG. 6 shows another example of evidence profile visualization that answers the question for finding a city in Minnesota in which Bethel College and Seminary is located. The bars show the contribution of each dimension to the final confidence score for the answers provided. While there is a Bethel College in both Saint Paul and South Bend, the correct answer is Saint Paul because it is in Minnesota. A user might not know that Saint Paul is in Minnesota and that South Bend is not. However, a user would be able to tell from the question that location might be a dimension that would need to be weighed heavily to determining the correct answer. If a user was provided with the hypotheses of both Saint Paul and South Bend, the user could use the evidence profile visualized in FIG. 6 and understand the certain dimensions, like location, should be weighed higher and other dimensions, like popularity, should be weighed lower. As such, the user could alter the weight associated with the evidence dimensions in order to arrive at the correct answer. The evidence profile showing each dimension and contribution to the evaluation of each hypothesis allows the user to make this change and obtain a correct answer. If this functionality were not available to a question answer system then an incorrect answer may be provided and the user would have no ability to discern whether the system was appropriately weighing the evidence, or confidently rely on the answer provided.

Figure 7:
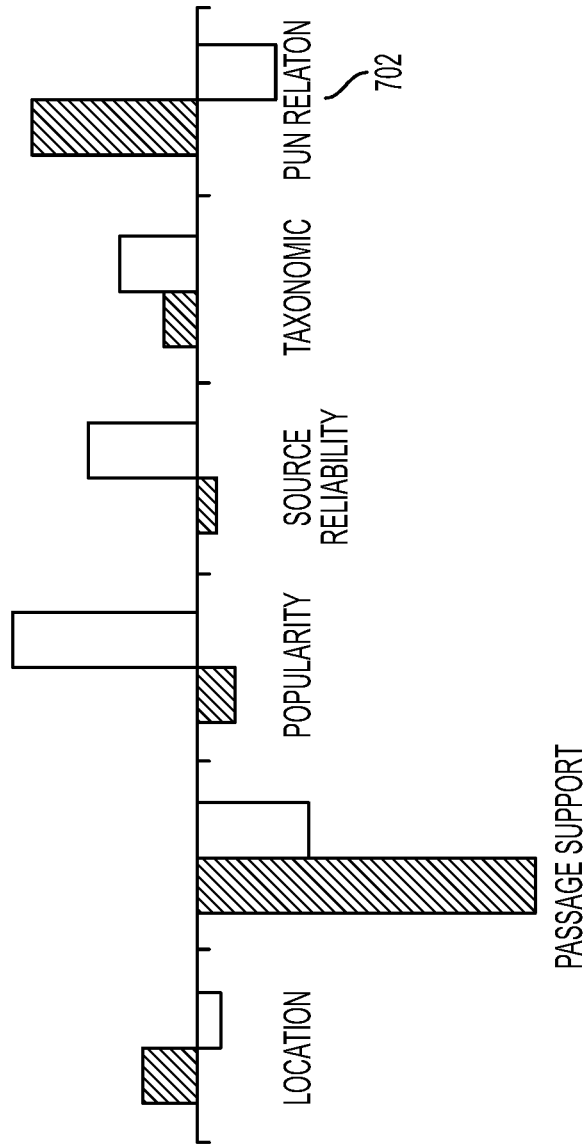
FIG. 7 shows an example of another dimension that played part in determining an answer in one embodiment of the present disclosure.

FIG. 7 shows an example of another dimension that played part in determining the final result (answer). For instance, puns may be another dimension considered for arriving at the answer. Humans may answer the question based on the pun since Saint Paul implies a "holy" city. A pun scorer may be added as another dimension that will discover and score pun-like relationships. Again, a user may be able to determine that the question is a pun and therefore more weight given to the pun relation 702.

The evidence profiling system and methodology in the present disclosure may be incorporated directly into a question answering system or be a separate module. For example, a question answering system may take a question, and from a corpus of data, generate candidate answers or hypotheses and associate supporting evidence. These hypotheses and associate supporting evidence could then be sent to a separate evidence profiling module that receives the hypothesis as input and generates one or more evidence profiles communicating the degree to which the supporting evidence supports or refutes the hypothesis as being correct. Evidence profiles may contain one or more different evidence dimensions and provide "scores" or values for each evidence dimension such that the scores for each dimension are comparable across different hypotheses.

Figure 8:
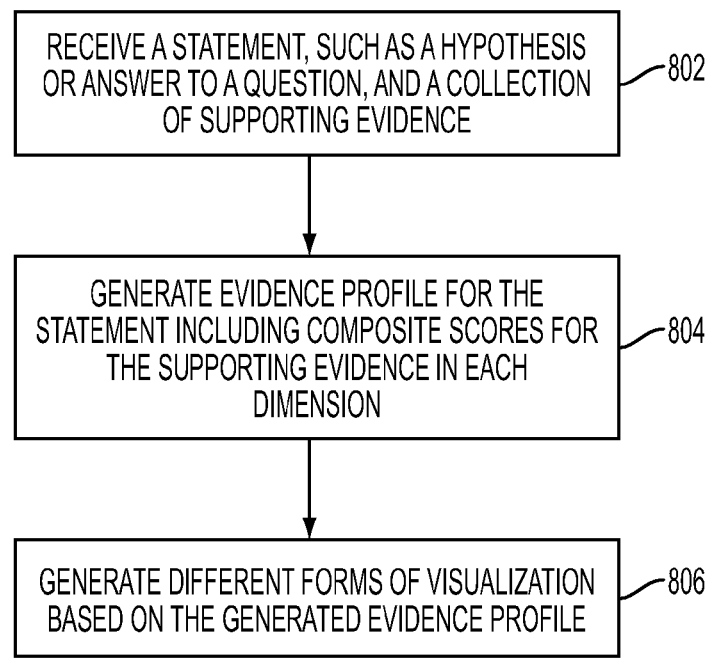
FIG. 8 is a flow diagram showing a method of evidence profiling in one embodiment of the present disclosure.

FIG. 8 is a flow diagram showing a method of evidence profiling in one embodiment of the present disclosure. At 802, a statement such as a hypothesis or answer to a question is received. Additionally, supporting evidence is received associated with each hypothesis. Examples of supporting evidence may include passages, documents, and/or entities in a database. At 804, an evidence profile is generated that describes various supporting evidence grouped into various dimensions and given a composite score contributing to a confidence score for each hypothesis. At 806, one or more visualizations may be generated to present the evidence profile.

Figure 9:
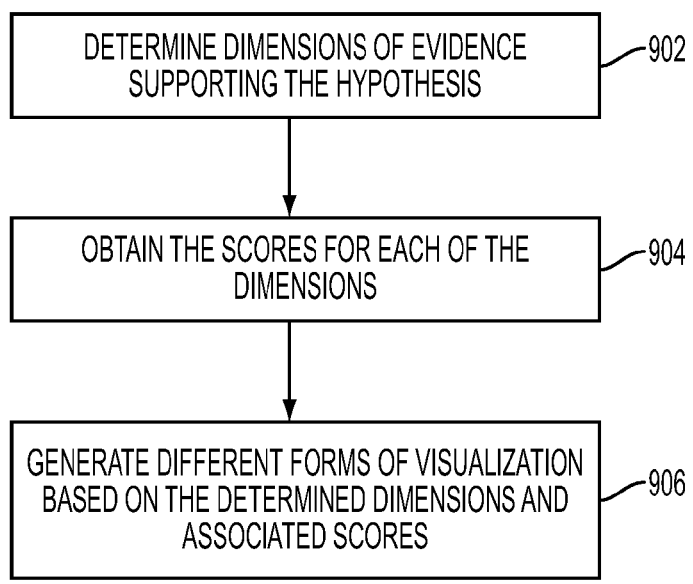
FIG. 9 illustrates generating an evidence profile in one embodiment of the present disclosure.

FIG. 9 illustrates generating an evidence profile in one embodiment of the present disclosure. At 902, dimensions of evidence supporting the hypothesis are determined. The dimensions may depend on the types of algorithms that were used to gather and score evidence. For example, a taxonomy of dimensions of evidence may be created that organizes algorithms used to score candidate answers into different dimensions of evidence. The taxonomy may be hierarchical, such that a given dimension of evidence can be specialized into a number of sub dimensions where each sub dimension of evidence represents a more specific kind of evidence under the parent dimension. The evidence profile can then be viewed at different granularities, starting with the top level, most coarse dimensions, or drilling down into the more specific sub dimensions of any particular dimension. The taxonomy is created such that a person using the evidence profiling system would be able to understand the meaning for each group or dimension. Based on this taxonomy and the associated algorithms, pieces of supporting evidence are categorized into certain dimensions within the taxonomy.

Examples of dimensions of evidence may include temporal, location, passage support, classification, popularity, source reliability, predicate plausibility, document support, hidden link, and/or others. Temporal dimension refers to events and people that happen during particular times and have likely life extents. Location dimension refers places, places located in or near other places, and to events that may happen in particular places. Passage Support dimension refers to passages that relate key entities to a candidate answer. Passage Support dimension may further include Shallow Evidence referring to passage superficially aligned with question text, and Deep Evidence in which candidate answer is understood to be in the right relationship with key entities based on logical analysis of passages. Classification dimension specifies that candidate answer should be of the right type (e.g., Woman, King, Disease, Invention). Popularity dimension specifies that Answer is popularly associated with parts of question. Source Reliability dimension specifies that Sources supporting answer are learned to be reliable. Predicate Plausibility dimension specifies that the answer is reasonable based on the role it plays in key relations. Document Support dimension specifies that the Document appears to discuss fact in context of answer. Hidden Link dimension specifies that candidate answer and question entities share common thread.

At 904, the scores of each of the dimensions may be obtained. Depending on how the dimension was created, this can be done in a number of ways. Algorithms relating to the dimension can be aggregated for example. The aggregation can be a summation, averaging, weighted averaging, or any other mathematical or statistical algorithm that aggregates multiple values into a single value.

At 906, different forms of visualization may be provided based on the determined dimensions and associated scores. For example, a simple listing of evidence dimensions for a hypothesis may be listed along with corresponding scores such as shown in FIG. 3. Or, one or more scores for one dimension may be compared to one or more scores for another dimension by listing scores and/or a bar chart displaying the difference such as shown in FIGS. 4 and 5. A preferred method of displaying dimensions is to provide a bar chart such as shown in FIGS. 6 and 7 that allows a user to quickly and easily determine the relative contribution of each dimension to the confidence score for each hypothesis.

In one embodiment of the present disclosure, evidence dimensions may be aggregated into a hierarchy. For example, the evidence profile may contain base dimensions and aggregate dimensions. Evidence dimension aggregation may be done manually, automatically, or by combination of both. Aggregation may include summation, averaging, weighted averaging, or any other mathematical or statistical algorithm that summarizes multiple dimensions (e.g., of finer granularity) into one aggregated dimension (e.g., coarse level of granularity).

Figure 10A:
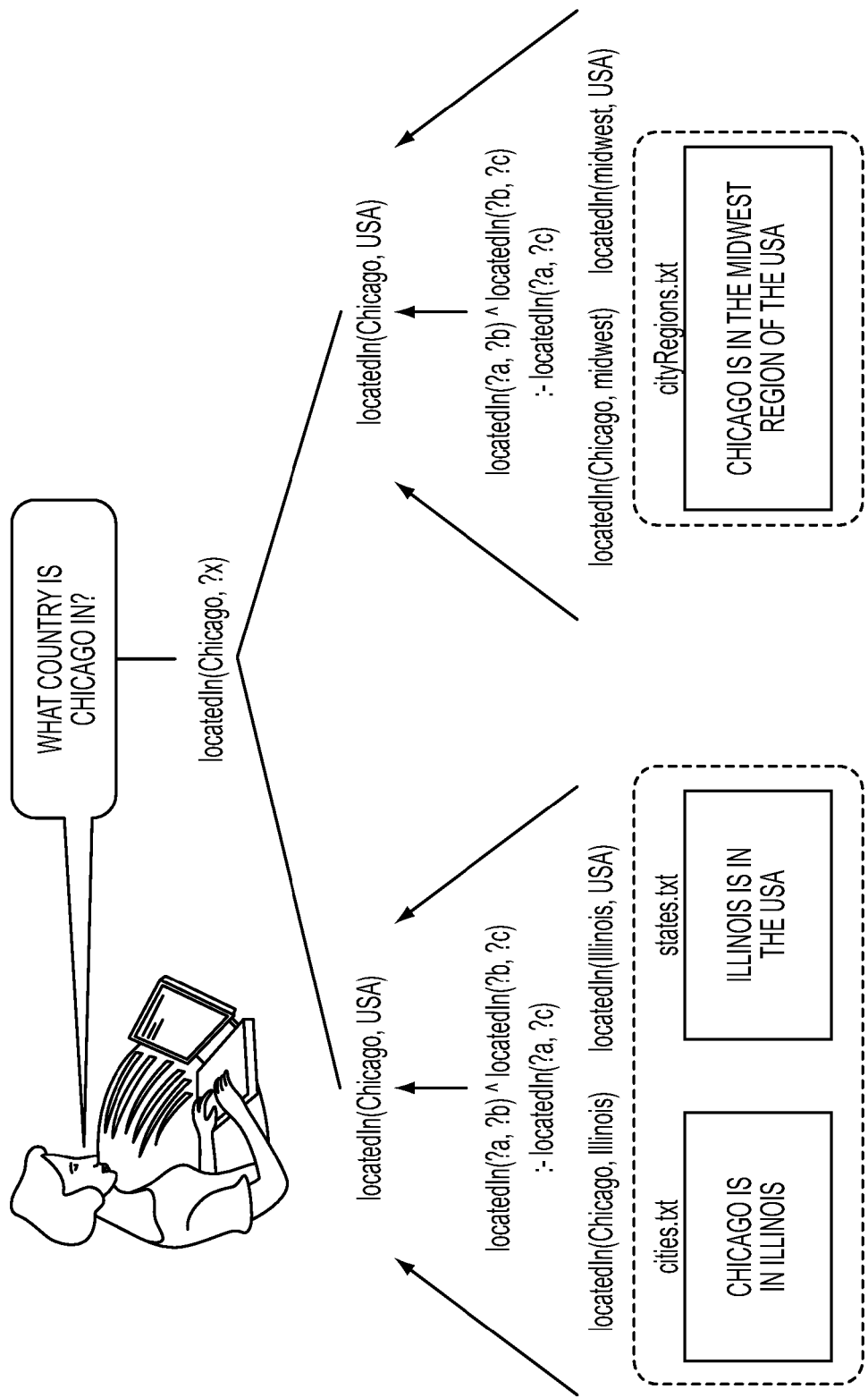
FIGS. 10A-10C illustrate an example QA system, for instance, which may provide a statement of hypothesis.
Figure 10B:
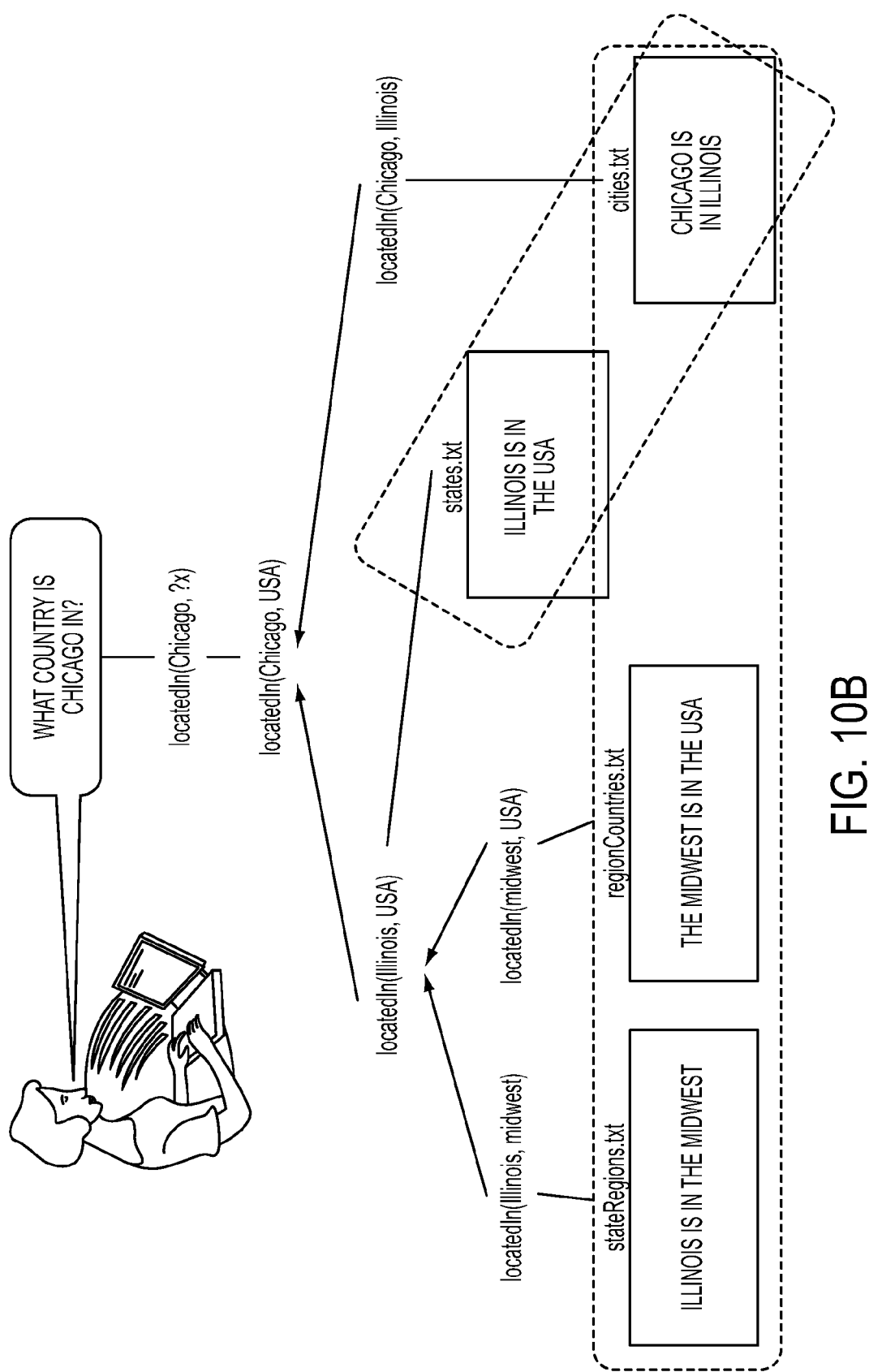
Figure 10C:
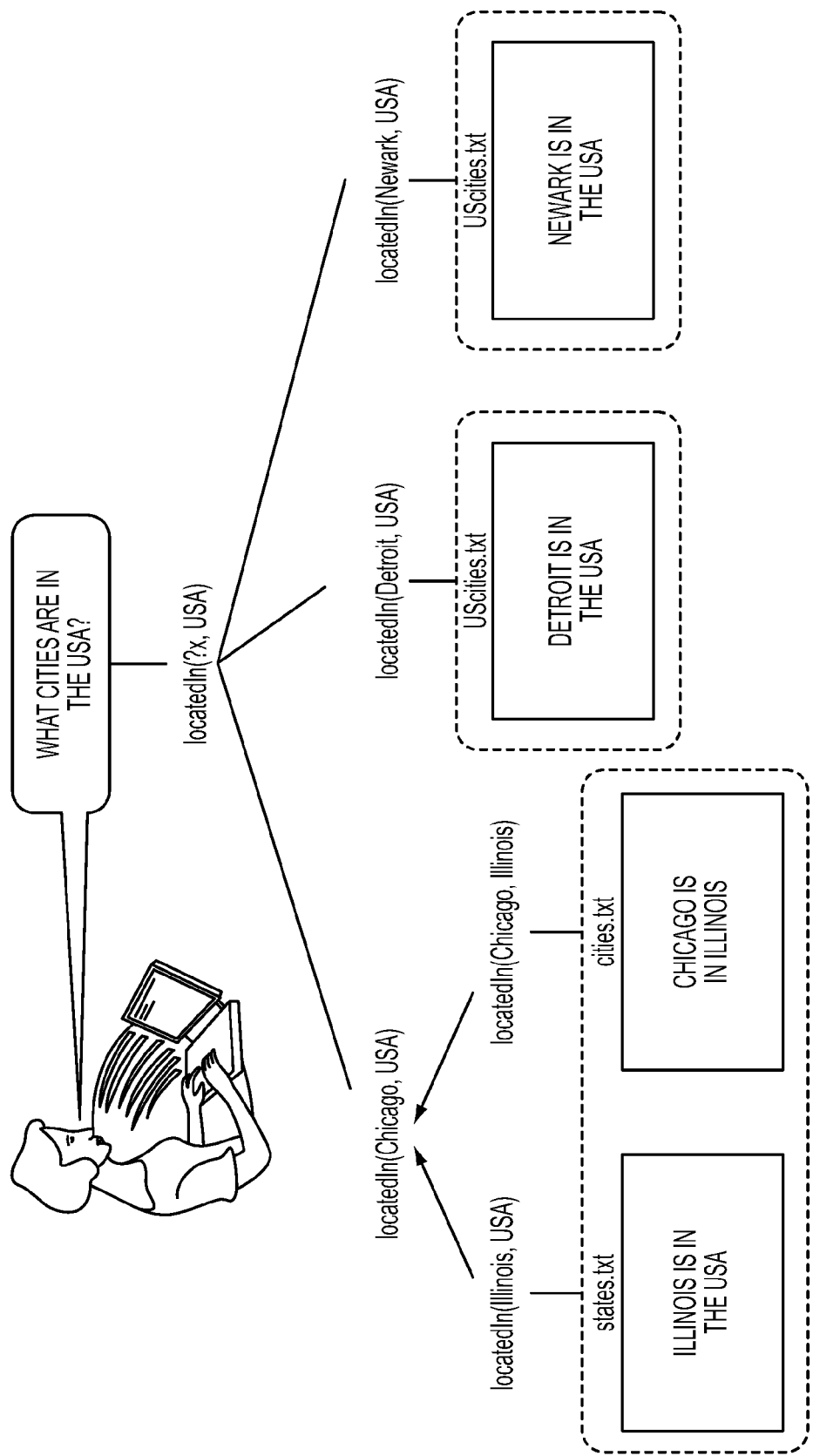

FIGS. 10A-10C illustrate an example QA system, for instance, which may provide a statement of hypothesis (or answer), and associated pieces of supporting evidence which then further may be profiled according to the evidence profiling disclosed above. The information retrieval system may identify a number of relevant sources and further analyze or synthesize the information contained in those segments to satisfy the user's information need, e.g., to generate the answer or hypothesis. In one aspect, the QA system may use logical proofs to guide search. A final conclusion that is produced in response to a query may be only indirectly derived from content found in multiple documents. FIG. 10A shows an example: a question such as "What country is Chicago in?" might be answered by separate documents that state that "Chicago is in Illinois" and that "Illinois is in the USA." Once a system has derived a conclusion (e.g., that Chicago is in the USA), it may be expected to provide support for that conclusion by citing original sources.

There may be multiple distinct proofs that can be found for any given conclusion. Each of these proofs may involve some set of assertions that are directly asserted in source material. Any given assertion may be stated in one or more sources. Some assertions are "leaves" of the proof tree; they occur only in the source material and are not computed from other assertions. Non-leaf assertions are derived from other assertions and may be directly stated in the sources. A leaf assertion is supported by any document that asserts it. A non-leaf assertion is supported by any document that asserts it or by the documents that support for each of the assertions that it was directly computed from. For example, in FIG. 10B, the assertion locatedIn (Illinois, USA) has two alternative sets of support: states.txt, which directly asserts it, and stateRegions.txt plus regionCountries.txt, which support each of the assertions directly used to compute it.

Some queries have responses that have multiple instances, each with one or more supporting documents. FIG. 10C illustrates this: "What cities are in the USA?" has many different answers and some of those answers may be asserted in a single document while others may emerge only from the combination of multiple documents.

At indexing time, given an unstructured (e.g., text) corpus: a structured repository (e.g., knowledge base, search index) may be built of assertions, e.g., using traditional knowledge extraction technologies (e.g., Indexing). For each assertion, one or more sources (e.g., document, passage) that asserted it may be recorded. At run time, given a query and a knowledge base, the query may be formalized (referred to as query analysis). Given the formal query, proofs of statements may be generated that match the query (referred to as Theorem Proving). For each proof, a set of documents may be generated (e.g., referred to as Document Selection). The set of documents may be generated by iterating a process which, for each assertion A that is a direct antecedent of the conclusion, either chose a source that asserts or iterate over the antecedents of A. The set of documents may be ordered based on relevance, parsimony, etc. (referred to as Document Set Ranking). In one embodiment, these steps can be performed using existing technology (e.g., Theorem Proving) and/or with extensions of existing technology (e.g., Document Set Ranking could be performed by extending algorithms for ranking individual documents) or others.

FIG. 11 illustrates a schematic of an example computer or processing system that may implement the evidence profiling in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 11 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an evidence profiling module 10 that performs the evidence profiling described herein. The evidence profiling module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20. The evidence profiling visualization, for example, may be presented on the display device 28. For instance, the evidence profiling module 10 may include visualization logic for generating the visualization or enabling the generation of the visualization, which visualization may be presented on the display device 28.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples, include, but are not limited to: microcode, device drivers, redundant processing units, external disk drive arrays, RAID systems, tape drives, and data archival storage systems, etc.

Evidence profiles provide a way for users to better understand how different kinds of evidence, and different kinds of analyses applied to that evidence, support or refute one or more hypotheses proposed as solutions to a given problem. For example, the problem may be a natural language question submitted to a Question Answering system, the hypotheses may be candidate answers for that question, and the evidence may include a wide variety of analyses applied to different kinds of evidence to support or refute each candidate answer. Evidence profiling may include receiving a statement of hypothesis generated based on content, generating an evidence profile communicating a degree to which the content supports the statement of hypothesis as a true statement, and enabling visualization of the evidence profile. An evidence profile may contain one or more dimensions of evidence which supported the statement of hypothesis, and a score associated with each of the dimensions of the evidence. Evidence profiling may also include presenting the evidence profile to the user using a variety of visualizations that allow the user to easily understand how a given hypothesis is supported or refuted by the evidence.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for evidence profiling, comprising:

receiving a candidate answer and supporting pieces of evidence; and generating, by a processor, an evidence profile communicating a degree to which the evidence supports the candidate answer as being correct, wherein the evidence profile provides dimensions of evidence and each dimension may support or refute the candidate answer as being correct, wherein the dimensions of evidence comprise at least taxonomic, geospatial, temporal, source reliability, passage support and popularity dimensions, and the supporting pieces of evidence comprise at least content whose features are grouped into said dimensions of evidence used to generate the evidence profile;

presenting one or more candidate answers with associated confidence levels, the candidate answer being one of said one or more candidate answers, said one or more candidate answers having a corresponding evidence profile, wherein a user is enabled to navigate to the evidence profile by selecting said one or more candidate answers, wherein a visualization of the evidence profile presents said selected one or more candidate answers by the dimensions with associated dimension scores, said dimension scores representing degrees to which the supporting pieces of evidence corresponding to the dimensions support said selected one or more candidate answers as being correct, wherein the user is enabled to further navigate to the supporting pieces of evidence used to produce the dimension scores via the visualization.

2. The method of claim 1 further comprising configuring the visualization of the evidence profile such that each dimension of evidence can be selected and a weight associated with each dimension altered.

3. The method of claim 1, further comprising:
configuring a selection of a desired dimension; and
displaying pieces of evidence contributing to a score for the selected dimension.

4. The method of claim 1, wherein the generating an evidence profile includes:

determining dimensions of evidence based on types of algorithms that were used to gather and score each piece of supporting evidence; and obtaining a score associated with each of the dimensions of the evidence by aggregating the scores for each piece of supporting evidence.

5. The method of claim 3, wherein the dimensions of evidence are aggregated into a hierarchy.

6. The method of claim 5, wherein the dimensions of evidence are aggregated automatically or manually or combinations thereof.

7. The method of claim 2, wherein the visualization includes presenting relative contributions of each of the dimensions of evidence supporting the candidate answer.

8. The method of claim 2, wherein the visualization includes showing comparison of two or more candidate answers, in which the dimensions of evidence supporting said two or more candidate answers are shown.

9. The method of claim 8, wherein only the dimensions of evidence that provide different levels of support for the two or more candidate answers are shown.

10. The method of claim 9, wherein relative differences in contribution of the dimensions of evidence between the two or more candidate answers are shown.

\* \* \* \* \*